United States Patent [19]

Usui et al.

[11] Patent Number: 5,643,636
[45] Date of Patent: Jul. 1, 1997

[54] CERAMIC COLOR COMPOSITION AND METHOD FOR PRODUCING A GLASS SHEET

[75] Inventors: Hiroshi Usui; Hitoshi Onoda; Tsuneo Manabe, all of Yokohama, Japan

[73] Assignee: Asahi Glass Company Ltd., Tokyo, Japan

[21] Appl. No.: 590,756

[22] Filed: Jan. 24, 1996

[30] Foreign Application Priority Data

Jan. 30, 1995 [JP] Japan .................... 7-013082

[51] Int. Cl.$^6$ ............................ B05N 3/02
[52] U.S. Cl. .............. 427/376.2; 427/404; 501/21; 501/51; 501/77
[58] Field of Search .................. 427/77, 96, 98, 427/123, 125, 376.2, 404; 501/21, 51, 77

[56] References Cited

U.S. PATENT DOCUMENTS

| | | | |
|---|---|---|---|
| 3,773,530 | 11/1973 | Morgan | 106/54 |
| 4,446,242 | 5/1984 | Holt | 501/96 |
| 4,792,536 | 12/1988 | Pecoraro et al. | 501/70 |
| 5,079,193 | 1/1992 | Donohue | 501/15 |
| 5,244,484 | 9/1993 | Chiba et al. | 65/24 |
| 5,266,533 | 11/1993 | Leung et al. | 501/12 |
| 5,332,412 | 7/1994 | Manabe et al. | 65/60.2 |

FOREIGN PATENT DOCUMENTS

| | | | |
|---|---|---|---|
| 6-234547 | 8/1994 | Japan . | |
| 6234547 | 8/1994 | Japan | C03C 8/14 |

*Primary Examiner*—Benjamin Utech
*Attorney, Agent, or Firm*—Oblon, Spivak, McClelland, Maier & Neustadt, P.C.

[57] ABSTRACT

A ceramic color composition comprising from 5 to 34 wt % of a heat resistant color pigment powder, from 65 to 94 wt% of a bismuth type glass powder, from 0 to 10 wt % of a refractory filler powder, and from 0.1 to 20 wt % of at least one additive selected from the group consisting of borides and silicides, as inorganic components.

9 Claims, No Drawings

CERAMIC COLOR COMPOSITION AND METHOD FOR PRODUCING A GLASS SHEET

BACKGROUND OF THE INVENTION

1. Field of the Invention

The present invention relates to a ceramic color composition and a method for producing a glass sheet.

2. Discussion of Background

Heretofore, a glass sheet provided with a ceramic color layer for an automobile has been widely used, which has been prepared by screen printing a ceramic color composition in a paste form along the periphery of a window glass of an automobile, followed by drying and baking in a step of heating the glass sheet for bending.

Such a ceramic color paste forms a colored opaque layer when baked along the peripheral portion of a glass sheet. This is employed for the purpose of preventing deterioration of a urethane sealant due to ultraviolet rays, or preventing electric heating wire terminals from being seen through from the exterior of the car, by the opaque layer.

As a composition for such a purpose, it is known to mix various heat resistant color pigments to a base material of low-melting point non-crystal line glass or crystallized type glass which usually contains lead as the main component. However, with respect to the material containing lead, which used to be mainly employed, it is desired to develop a substitute containing no lead from the viewpoint of e.g. recycling.

The present inventors have previously proposed a bismuth type material as a ceramic color composition which contains no lead and which is excellent in a release property (Japanese Unexamined patent publication No. 234547/1994 and U.S. patent application Ser. No. 08/314,290). U.S. patent application Ser. No. 08/314,290 proposes also a ceramic color composition having metallic Si powder added to a Bi type glass powder. However, such a composition tends to be slightly yellowish by the addition of the metallic Si powder.

The previously proposed material is basically excellent. However, it has been apparent by now that as compared with the conventional lead type material, it has a problem that the strength of the glass sheet having the ceramic color paste baked thereto, is slightly low.

SUMMARY OF THE INVENTION

It is an object of the present invention to provide a ceramic color composition which is capable of improving the strength of a glass sheet when a ceramic color paste containing a glass powder of bismuth type, is baked thereto.

The present invention has been made to solve the above mentioned problem and provides a ceramic color composition comprising from 5 to 34 wt % of a heat resistant color pigment powder, from 65 to 94 wt % of a bismuth type glass powder, from 0 to 10 wt % of a refractory filler powder, and from 0.1 to 20 wt % of at least one additive selected from the group consisting of borides and silicides, as inorganic components.

Particularly, the present invention provides the above ceramic color composition wherein the glass composition contains bismuth in an amount of at least 25 wt % as calculated as $Bi_2O_3$.

Further, the present invention provides the above mentioned ceramic color composition, wherein the composition of the glass powder consists essentially of from 10 to 36 wt % of $SiO_2$, from 25 to 75 wt % of bismuth oxide (as calculated as $Bi_2O_3$), from 0 to 25 wt % of $B_2O_3$, from 0 to 15 wt % of $Li_2O$, from 0 to 15 wt % of $Na_2O$, from 0 to 15 wt % of $K_2O$, from 0 to 19 wt % of BaO and from 0 to 10 wt % of $TiO_2$.

Still further, the present invention provides a method for producing glass sheet provided with a ceramic color layer, which comprises preparing a ceramic color paste containing the above ceramic color composition, coating the ceramic color paste on at least a part of a glass sheet surface to form a layer of the ceramic color paste, followed by heating and firing to bake the ceramic color layer to the glass sheet surface.

Particularly, the present invention provides a method for producing a glass sheet provided with a ceramic color layer, which comprises preparing a ceramic color paste containing the above ceramic color composition, coating the ceramic color paste on at least a part of a glass sheet surface to form a layer of the ceramic color paste, forming a layer of a silver paste to cover at least a part of the layer of the ceramic color paste, followed by heating and firing to bake the ceramic color layer and the silver layer to the glass sheet surface.

DETAILED DESCRIPTION OF THE PREFERRED EMBODIMENTS

The ceramic color composition of the present invention is particularly suitable for baking to a glass sheet commonly used for e.g. a window, i.e. a soda lime silica glass sheet having a composition comprising from 68 to 74 wt % of $SiO_2$, from 0.5 to 2 wt % of $Al_2O_3$, from 7 to 12 wt % of CaO, from 2 to 5 wt % of MgO and from 9 to 15 wt % of $Na_2O$. Namely, the ceramic color composition is baked to the glass plate by heating.

In the ceramic color composition proposed by the present invention, the inorganic components comprise from 5 to 34 wt % of a heat resistant color pigment powder, from 65 to 94 wt % of a bismuth-containing glass powder, from 0 to 10 wt % of a refractory filler powder and from 0.1 to 20 wt % of at least one additive selected from the group consisting of borides and silicides.

If the content of the bismuth-containing glass powder is too small, it tends to be difficult to bake the ceramic color composition to the glass sheet at a temperature for bending the glass sheet. On the other hand, if it is too large, the content of the heat resistant color pigment powder tends to be small, whereby it tends to be difficult to obtain the desired color density. This glass powder contains bismuth and thus serves to improve the strength of the glass sheet in cooperation with the additive, which will be explained hereinafter.

If the content of the heat resistant color pigment powder is too small, it tends to be difficult to obtain the desired color density. More preferably, the content is at least 7 wt %. On the other hand, if it is too large, the amount of the glass tends to be small, whereby it becomes difficult to bake the ceramic color composition to the glass sheet at a temperature for bending the glass sheet. The content is preferably at most 30 wt %. As such a heat resistant color pigment, the one composed essentially of oxides of iron and manganese, the one composed mainly of oxides of copper and chromium, or the one composed mainly of oxides of cobalt and chromium, may, for example, be mentioned.

The refractory filler powder is not essential. However, by incorporating this refractory filler powder, it is possible to control the expansion coefficient or the fluidity. Therefore, it is preferably contained in an amount of at least 0.1 wt %. If the content of the refractory filler powder is too large, the glass content tends to be relatively small, whereby it tends to be difficult to bake the ceramic color composition to the glass sheet at a temperature for bending the glass sheet. As such a refractory filler, α-alumina, α-quartz, zircon, cordierite, forsterite, calcium titanate, strontium titanate, barium titanate or bismuth titanate may, for example, be mentioned.

With the ceramic color composition of the present invention, in a step of firing to bake it to a glass sheet, the above mentioned additive functions in cooperation with the bismuth-containing glass to improve the strength of the glass sheet. The amount of the additive is preferably at least 1 wt %. If it is too much, the structure after the baking tends to be coarse, whereby the scratch resistance tends to be low. From this viewpoint, the amount is preferably at most 15 wt %.

Such an additive is at least one member selected from the group consisting borides and silicides.

Further, to the ceramic color composition, other metal may be incorporated in an amount within a range of from 0 to 10 wt %, as a colorant or a release agent. If this amount is too much, the glass content tends to be relatively to small, whereby it tends to be difficult to bake the ceramic color composition to the glass sheet at a temperature for bending the glass sheet. As such a metal, Ni, Sn, Ti, Mn, Fe, Cu, Ag, La, Zr, Co, Mo, Cr or Ce may, for example, be mentioned.

The borides for the present invention are not particularly limited and include, for example, zirconium boride, chromium boride, tungsten boride, molybdenum boride and titanium boride. Among them, zirconium boride is highly effective for improving the strength of the glass sheet. Likewise, the silicides are not particularly limited and include, for example, magnesium silicide, calcium silicide, cobalt silicide, molybdenum silicide, iron silicide and titanium silicide. When a silicide or a boride is used as the additive, the amount is preferably at least 1 wt % and at most 15 wt %.

There is no particular restriction as to the synthesis or purity of such a silicide or boride. However, the smaller the particle size, higher the effect for improving the strength of a glass sheet. Accordingly, the average particle size is preferably at most 30μm.

The bismuth-containing glass is preferably the one having a bismuth content of at least 25 wt %, as BiO, $Bi_2O_3$, etc. are calculated as $Bi_2O_3$. Among them, the one having the following composition is particularly preferred.

Namely, the preferred composition of the bismuth-containing glass consists essentially of from 10 to 36 wt % of $SiO_2$, from 25 to 75 wt % of bismuth oxide (calculated as $Bi_2O_3$), from 0 to 25 wt % of $B_2O_3$, from 0 to 15 wt % of $Li_2O$, from 0 to 15 wt % of $Na_2O$, from 0 to 15 wt % of $K_2O$, from 0 to 19 wt % of BaO, and from 0 to 10 wt % of $TiO_2$.

Among these components, if the content of $SiO_2$ is too small, the chemical durability tends to be low. If the content is too large, the glass softening point tends to be too high, whereby it will be difficult to accomplish baking at a temperature for bending the glass sheet.

If the content of $Bi_2O_3$ is too small, the glass softening point tends to be too high. On the other hand, If it is too large, the chemical durability tends to be low, such being undesirable.

$B_2O_3$ is not an essential component. However, when it is incorporated in an amount of at least 0.1 wt %, the melting property of glass can be improved. However, if its content is too large, it is likely to adhere to a bending die in the step of bending the glass sheet, and the release property tends to be low.

$Li_2O$, $Na_2O$ and $K_2O$ are not essential components. However, if they are incorporated in an amount of at least 0.1 wt %, it is possible to improve the melting property of the glass. However, if the content is too large, the thermal expansion coefficient tends to be too large, whereby the strength of a curved glass tends to be low. Further, their total amount is preferably at most 15 wt %. If their total amount is too much, the thermal expansion coefficient tends to be too large, whereby the strength of a carved glass tends to be low.

BaO is not an essential component. However, if it is incorporated in an amount of at least 0.1 wt %, it is possible to improve the fluidity of the glass. However, if its content is too large, the release property and the acid resistance tend to be low.

$TiO_2$ is not an essential component. However, when it is incorporated in an amount of at least 0.1 wt %, it is possible to improve the chemical durability of the glass. However, if its content is too large, devitrification tends to occur during melting of the glass.

In addition to the above components, this bismuth-containing glass may further contain a component such as $Al_2O_3$, $La_2O_3$, $ZrO_2$, $SnO_2$, MgO, CaO, SrO, ZnO, $P_2O_5$ or $CeO_2$ to adjust the sintering temperature, the chemical durability or the thermal expansion coefficient, to an extent not to impair the homogeneity of the glass.

Further, the weight average particle size of each of the above mentioned powders is preferably within a range of from 0.1 to 10 μm. If the weight average particle size is too small, the productivity tends to be substantially poor, and the products tends to be expensive. Preferably, the weight average particle size is at least 1 μm. On the other hand, if it is too large, the screen printing property of the paste tends to be poor. Accordingly, the weight average particle size is at most 6 μm.

The ceramic color composition of the present invention is prepared in accordance with a conventional method by uniformly dispersing and kneading a predetermined amounts of the above inorganic components with an organic vehicle to obtain a paste. The organic vehicle may, for example, be the one prepared by dissolving a commonly employed polymer such as ethyl cellulose, an acryl resin, a styrene resin, a phenol resin or a butyral resin in a solvent such as α-terpineol, butylcarbitol acetate or a phthalic acid ester.

In the method for producing a glass sheet of the present invention, the ceramic color composition formed into a paste, is coated at a desired portion of the surface of a soda lime silica glass sheet commonly used as a window glass, by a coating means such as screen printing. The portion to be coated is, for example, the peripheral portion of a front glass, a side glass or a rear glass in the case of a glass sheet for an automobile. Then, the glass sheet having such a ceramic color composition coated thereon, is dried, and a silver paste is further printed so as to cover a part of the ceramic color printed portion, followed by drying. Then, the glass sheet is transferred into a heating furnace and heated. The temperature for this heating is within a range of from 500° to 620° C. At this temperature, the coated ceramic color composition fuses to the glass sheet.

Then, the glass is further maintained at a temperature of from 600° to 700° C., so that the fused ceramic color composition is baked together with the silver paste to the glass sheet. Then, the glass sheet is subjected to bending treatment by a press apparatus provided in the furnace or by a forming apparatus such as a vacuum adsorption forming apparatus or a self gravity bending apparatus, in accordance with a conventional method. Here, the die for the press apparatus or the vacuum adsorption forming apparatus is usually made of a stainless steel covered with a glass fiber cloth, and the glass sheet is pressed via this cloth.

Now, present invention will be described in further detail with reference to Examples. However, it should be understood that the present invention is by no means restricted by such specific Examples.

EXAMPLES 1 TO 12 AND COMPARATIVE EXAMPLES 1 TO 25

Materials were prepared and mixed to obtain the glass compositions (unit: wt %) as shown in Tables 1 to 6, followed by melting and vitrifying at a temperature of from 1,200° to 1,500° C. to obtain glasses. Then, each of these glasses was pulverized by a ball mill to obtain a glass powder having a weight average particle size of about 2.5 μm. This glass powder, a heat resistant black pigment powder (#9510, manufactured by Dainichi Seika K. K.), a heat resistant filler (alumina) and various additives (a silicide or a boride) were mixed in a weight ratio as shown in the column for "paste composition" in Tables 1 to 6.

Then, to 80 parts by weight of this powder mixture, 20 parts by weight of a solution having 10 wt % of ethyl cellulose dissolved in α-terpineol, was added and kneaded. The mixture was homogeneously dispersed by a triple roll mill and adjusted to a desired paste viscosity. The obtained paste form ceramic color composition was screen-printed over the entire surface of a soda lime silica glass sheet (thickness: 3.5 mm, size: 9 cm×10 cm) so that the thickness after firing would be 15 μm, followed by drying.

This glass sheet was heated to 650° C. to bake the ceramic color composition to the glass sheet. The baked glass sheet was secured on a cylindrical jig of 100 mm in diameter with the printed side facing below, and the center of the glass sheet was pressed from above, whereupon the breaking load was measured, and the results are shown in the Tables. Further, also in Comparative Examples, in the same manner as in Examples, the ceramic color compositions were prepared, and they were baked to glass sheets in the same manner, the breaking loads were measured, and the results are shown in Tables 1 to 6.

As is apparent from Tables 1 to 6, the ceramic color compositions of the present invention having silicides or borides incorporated thereto, remarkably improve the bending strength of glass sheets when they were baked on the glass sheets. Further, as is evident from the comparison between Tables 5 and 6, the effects of the additives for improving the strength after baking are effective particularly in the combination with a bismuth type glass rather than in a combination with a lead type glass.

TABLE 1

| | Examples | | | | |
|---|---|---|---|---|---|
| | 1 | 2 | 3 | 4 | 5 |
| Paste composition | | | | | |
| Glass | 70 | 75 | 70 | 80 | 70 |
| Heat resistant pigment | 20 | 13 | 22 | 12 | 22 |
| Alumina | 5 | 5 | 3 | 3 | 3 |
| Additive | 5 | 7 | 5 | 5 | 5 |
| Material of the additive | $ZrB_2$ | $ZrB_2$ | $CrB_2$ | $WB_2$ | $Mg_2Si$ |
| Glass composition | | | | | |
| $Bi_2O_3$ | 67.0 | 67.0 | 67.0 | 67.0 | 67.0 |
| $SiO_2$ | 18.0 | 18.0 | 18.0 | 18.0 | 18.0 |
| $B_2O_3$ | 3.3 | 3.3 | 3.3 | 3.3 | 3.3 |
| $Li_2O$ | 0.7 | 0.7 | 0.7 | 0.7 | 0.7 |
| $Na_2O$ | — | — | — | — | — |
| BaO | 11.0 | 11.0 | 11.0 | 11.0 | 11.0 |
| $TiO_2$ | — | — | — | — | — |
| Glass sheet breaking load (kg) | 90 | 95 | 73 | 71 | 73 |

TABLE 2

| | Examples | | | | | | |
|---|---|---|---|---|---|---|---|
| | 6 | 7 | 8 | 9 | 10 | 11 | 12 |
| Paste composition | | | | | | | |
| Glass | 80 | 75 | 70 | 70 | 80 | 75 | 70 |
| Heat resistant pigment | 12 | 17 | 18 | 22 | 12 | 17 | 18 |
| Alumina | 3 | 3 | 5 | 3 | 3 | 3 | 5 |
| Additive | 5 | 5 | 7 | 5 | 5 | 5 | 7 |
| Material of the additive | $Ca_2Si$ | $ZrB_2$ | $ZrB_2$ | $CrB_2$ | $WB_2$ | $Mg_2Si$ | $Ca_2Si$ |
| Glass composition | | | | | | | |
| $Bi_2O_3$ | 67.0 | 68.9 | 68.9 | 68.9 | 68.9 | 68.9 | 68.9 |
| $SiO_2$ | 18.0 | 17.8 | 17.8 | 17.8 | 17.8 | 17.8 | 17.8 |
| $B_2O_3$ | 3.3 | 6.3 | 6.3 | 6.3 | 6.3 | 6.3 | 6.3 |
| $Li_2O$ | 0.7 | — | — | — | — | — | — |
| $Na_2O$ | — | — | — | — | — | — | — |
| BaO | 11.0 | 7.0 | 7.0 | 7.0 | 7.0 | 7.0 | 7.0 |
| $TiO_2$ | — | — | — | — | — | — | — |
| Glass sheet breaking load (kg) | 85 | 92 | 97 | 75 | 71 | 70 | 83 |

TABLE 3

| | Examples | | | | | | |
|---|---|---|---|---|---|---|---|
| | 1 | 2 | 3 | 4 | 5 | 6 | 7 |
| Paste composition | | | | | | | |
| Glass | 75 | 75 | 75 | 75 | 70 | 70 | 70 |
| Heat resistant pigment | 22 | 17 | 17 | 17 | 25 | 25 | 25 |
| Alumina | 3 | 3 | 3 | 3 | 5 | 5 | 5 |
| Additive | — | 5 | 5 | 5 | — | — | — |
| Material of the additive | | Mn | Cr | Ni | | | |
| Glass composition | | | | | | | |
| $Bi_2O_3$ | 70.7 | 70.7 | 70.7 | 70.7 | 64.3 | 67.0 | 68.9 |
| $SiO_2$ | 16.5 | 16.5 | 16.5 | 16.5 | 20.0 | 18.0 | 17.8 |
| $B_2O_3$ | 6.5 | 6.5 | 6.5 | 6.5 | 3.5 | 3.3 | 6.3 |
| $Li_2O$ | 0.4 | 0.4 | 0.4 | 0.4 | 0.7 | 0.7 | — |

TABLE 3-continued

| | Examples | | | | | | |
|---|---|---|---|---|---|---|---|
| | 1 | 2 | 3 | 4 | 5 | 6 | 7 |
| $Na_2O$ | — | — | — | — | — | — | — |
| BaO | 3.8 | 3.8 | 3.8 | 3.8 | 11.5 | 11.0 | 7.0 |
| $TiO_2$ | 2.1 | 2.1 | 2.1 | 2.1 | — | — | — |
| Glass sheet breaking load (kg) | 56 | 58 | 54 | 55 | 52 | 50 | 53 |

TABLE 4

| | Comparative Examples | | | | | |
|---|---|---|---|---|---|---|
| | 8 | 9 | 10 | 11 | 12 | 13 |
| Paste composition | | | | | | |
| Glass | 70 | 70 | 70 | 80 | 80 | 80 |
| Heat resistant pigment | 22 | 22 | 22 | 17 | 10 | 10 |
| Alumina | 5 | 5 | 5 | 3 | 3 | 3 |
| Additive | 3 | 3 | 3 | — | 7 | 7 |
| Material of the additive | Co | Sn | Fe | | Ti | W |
| Glass composition | | | | | | |
| $Bi_2O_3$ | 64.3 | 64.3 | 64.3 | 64.5 | 64.5 | 64.5 |
| $SiO_2$ | 20.0 | 20.0 | 20.0 | 25.1 | 25.1 | 25.1 |
| $B_2O_3$ | 3.5 | 3.5 | 3.5 | — | — | — |
| $Li_2O$ | 0.7 | 0.7 | 0.7 | 1.3 | 1.3 | 1.3 |
| $Na_2O$ | — | — | — | 4.0 | 4.0 | 4.0 |
| BaO | 11.5 | 11.5 | 11.5 | — | — | — |
| $TiO_2$ | — | — | — | 5.1 | 5.1 | 5.1 |
| Glass sheet breaking load (kg) | 52 | 54 | 57 | 40 | 42 | 41 |

TABLE 5

| | Comparative Examples | | | | | | |
|---|---|---|---|---|---|---|---|
| | 14 | 15 | 16 | 17 | 18 | 19 | 20 |
| Paste composition | | | | | | | |
| Glass | 70 | 70 | 70 | 70 | 70 | 70 | 80 |
| Heat resistant pigment | 30 | 27 | 27 | 27 | 25 | 27 | 20 |
| Alumina | — | — | — | — | — | — | — |
| Additive | — | 3 | 3 | 3 | 5 | 3 | — |
| Material of the additive | | Si | Mn | Fe | $ZrB_2$ | $Mg_2Si$ | |
| Glass composition | | | | | | | |
| PbO | 66.8 | 66.8 | 66.8 | 66.8 | 66.8 | 66.8 | 65.0 |
| $SiO_2$ | 20.2 | 20.2 | 20.2 | 20.2 | 20.2 | 20.2 | 16.5 |
| $B_2O_3$ | — | — | — | — | — | — | 5.0 |
| $Al_2O_3$ | 0.5 | 0.5 | 0.5 | 0.5 | 0.5 | 0.5 | 2.5 |
| $Li_2O$ | 0.3 | 0.3 | 0.3 | 0.3 | 0.3 | 0.3 | — |
| $Na_2O$ | 0.8 | 0.8 | 0.8 | 0.8 | 0.8 | 0.8 | 1.0 |
| $K_2O$ | 0.4 | 0.4 | 0.4 | 0.4 | 0.4 | 0.4 | — |
| $TiO_2$ | 11.0 | 11.0 | 11.0 | 11.0 | 11.0 | 11.0 | 10.0 |
| Glass sheet breaking load (kg) | 63 | 62 | 62 | 60 | 62 | 62 | 60 |

TABLE 6

| | Comparative Examples | | | | |
|---|---|---|---|---|---|
| | 21 | 22 | 23 | 24 | 25 |
| Paste composition | | | | | |
| Glass | 80 | 80 | 80 | 80 | 80 |
| Heat resistant pigment | 15 | 15 | 15 | 15 | 13 |
| Alumina | — | — | — | — | — |
| Additive | 5 | 5 | 5 | 5 | 7 |
| Material of the additive | Si | Ni | Cr | $CrB_2$ | $Ca_2Si$ |
| Glass composition | | | | | |
| PbO | 65.0 | 65.0 | 65.0 | 65.0 | 65.0 |
| $SiO_2$ | 16.5 | 16.5 | 16.5 | 16.5 | 16.5 |
| $B_2O_3$ | 5.0 | 5.0 | 5.0 | 5.0 | 5.0 |
| $Al_2O_3$ | 2.5 | 2.5 | 2.5 | 2.5 | 2.5 |
| $Li_2O$ | — | — | — | — | — |
| $Na_2O$ | 1.0 | 1.0 | 1.0 | 1.0 | 1.0 |
| $K_2O$ | — | — | — | — | — |
| $TiO_2$ | 10.0 | 10.0 | 10.0 | 10.0 | 10.0 |
| Glass sheet breaking load (kg) | 61 | 58 | 61 | 61 | 59 |

The ceramic color composition of the present invention contains no lead and remarkably improves the strength after baking of a soda lime silica glass sheet.

What is claimed is:

1. A ceramic color composition comprising from 5 to 34 wt % of a heat resistant color pigment powder, from 65 to 94 wt % of a bismuth oxide-based glass powder, from 0 to 10 wt % of a refractory filler powder, and from 0.1 to 20 wt % of at least one additive selected from the group consisting of borides and silicides, wherein the composition of the glass powder consists essentially of from 10 to 36 wt % of $SiO_2$, from 25 to 75 Wt% Of $Bi_2O_3$, from 3.3 to 25 wt % of $B_2O_3$, from 0 to 15 wt % of $Li_2O$, from 0 to 15 wt % of $Na_2O$, from 0 to 15 wt % of $K_2O$, from 0.1 to 19 wt % of BaO and from 0 to 10 wt % of $TiO_2$.

2. The ceramic color composition according to claim 1, wherein the heat resistant color pigment powder is contained in an amount of 7 to 34 wt.%.

3. The ceramic color composition according to claim 1, wherein the refractory filler powder is contained in an amount of at least 0.1 wt.%.

4. The ceramic color composition according to claim 1, wherein the at least one additive is contained in an amount of from 1 to 15 wt.%.

5. The ceramic color composition according to claim 1, wherein the at least one additive is a boride selected from the group consisting of zirconium boride, chromium boride, tungsten boride, molybdenum boride and titanium boride.

6. The ceramic color composition according to claim 1, wherein the at least one additive is a silicide selected from the group consisting of magnesium silicide, calcium silicide, cobalt silicide, molybdenum silicide, ferric silicide and titanium silicide.

7. The ceramic color composition according to claim 1, wherein the bismuth oxide-based glass powder contains at least 0.1 wt.% of $TiO_2$.

8. A method for producing a glass sheet provided with a ceramic color layer, which comprises preparing a ceramic color paste containing the ceramic color composition of claim 1, coating the ceramic color paste on at least a part of a glass sheet surface to form a layer of the ceramic color paste, followed by heating and firing to bake the ceramic color layer to the glass sheet surface.

9. A method for producing a glass sheet provided with a ceramic color layer, which comprises preparing a ceramic color paste containing the ceramic color composition of claim 1, coating the ceramic color paste on at least a part of a glass sheet surface to form a layer of the ceramic color paste, forming a layer of a silver paste to cover at least a part of the layer of the ceramic color paste, followed by heating and firing to bake the ceramic color layer and the silver layer to the glass sheet surface.

* * * * *